(12) United States Patent
Ochi

(10) Patent No.: US 7,834,934 B2
(45) Date of Patent: Nov. 16, 2010

(54) VIDEO SIGNAL OUTPUT DEVICE

(75) Inventor: Hiroshi Ochi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1052 days.

(21) Appl. No.: 11/589,153

(22) Filed: Oct. 30, 2006

(65) Prior Publication Data

US 2007/0081097 A1    Apr. 12, 2007

(30) Foreign Application Priority Data

Nov. 10, 2005    (JP) .............. 2005-325890

(51) Int. Cl.
*H04N 7/01* (2006.01)
*H04N 5/46* (2006.01)

(52) U.S. Cl. ............... 348/556; 348/446; 348/448; 348/445

(58) Field of Classification Search ........... 348/445, 348/446, 448, 458, 459, 554–558; *H04N 7/01, H04N 11/20, 3/27, 5/46*
See application file for complete search history.

(56) References Cited

U.S. PATENT DOCUMENTS 7,596,297 B2 *   9/2009   Kato .................. 348/448

2005/0179817 A1 *  8/2005  Kida .................. 348/556

FOREIGN PATENT DOCUMENTS

JP    A-2003-153115    5/2003
JP    A-2004-356688   12/2004

* cited by examiner

*Primary Examiner*—Sherrie Hsia
(74) *Attorney, Agent, or Firm*—Morgan Lewis & Bockius LLP

(57) ABSTRACT

When television screen setting is not set and thus a television screen setting completion flag is not set, and a terminals-connection judgment pin takes a low level, an i/p selection screen is initially displayed on a progressive display device. However, the i/p selection screen is not displayed on an interlaced display device. When processing performed for the i/p selection screen is completed, or when the terminals-connection judgment pin takes a high level, indicating that the video input D-terminal of the display device is not connected to the video output D-terminal, an aspect ratio setting screen is displayed. After aspect ratio setting is completed, the television screen setting completion flag is set. This eliminates the need to perform the television screen setting again.

4 Claims, 8 Drawing Sheets

16:9 VIDEO IMAGE

4:3 PAN AND SCAN

16:9 VIDEO IMAGE

4:3 STANDARD

VIDEO SIGNAL OUTPUT DEVICE

This application is based on Japanese Patent Application No. 2005-325890 filed on Nov. 10, 2005, the contents of which are hereby incorporated by reference.

BACKGROUND OF THE INVENTION

1. Field of the Invention

The present invention relates to a video signal output device provided with a video signal conversion circuit that converts a video signal inputted from an apparatus for reproducing a hard disk, a DVD (digital versatile disc), or the like, into an interlaced video signal or a progressive video signal, and a video output circuit that outputs the video signal converted by the video signal conversion circuit to a display device such as a television receiver or a monitor.

2. Description of Related Art

The widespread use of apparatuses for reproducing a hard disk, a DVD, or the like makes it possible to digitally record a large amount of video signals and reproduce video of higher quality than that of a conventional video tape. These reproducing apparatuses are connected to a television receiver or a monitor so as to display video thereon. However, since conventional display devices adopt interlacing to display video, the quality of the video displayed thereby tends to deteriorate. In interlacing, one frame of video consists of 525 scan lines, which are divided into two fields, namely an odd field and an even field, to display video. This causes flicker or other problems.

To deal with such problems, progressive scan that displays one frame of video at one time has been developed and put into practical use. Thus, by displaying a video signal of the reproducing apparatus with a television receiver or a monitor adopting progressive scan, it is possible to offer high quality video without flicker.

Disadvantageously, in a case where the reproducing apparatus is connected to a television receiver or a monitor that supports only interlacing, and then a video signal is outputted therefrom in a progressive manner, the video becomes distorted and is not displayed normally. To address this disadvantage, the reproducing apparatus incorporates a video signal output device that makes it possible to output a video signal in both interlaced and progressive manners, allowing the television receiver or the monitor that adopts interlacing to display video normally.

However, since the television receiver or the monitor that adopts progressive scan can display an interlaced video signal as well as a progressive video signal, even when the user selects interlacing in screen setting, the television receiver or the monitor displays video without utilizing its original function, progressive scan. In such a case, although the television receiver or the monitor adopts progressive scan, the user is not allowed to enjoy high quality video because progressive scan is not selected.

JP-A-2004-356688 discloses a video signal output device wherein, when an item "Output Setting" in a menu screen displayed on a television receiver is selected by the user (operator), an output setting screen is displayed on the television receiver. If "Progressive Output" is selected in the output setting screen within, for example, 10 seconds, video display in a progressive manner is made possible in a television receiver adopting progressive scan, and, if no selection is made after a lapse of 10 seconds, "Interlaced Output" is automatically selected, and video display is made possible in both a television receiver adopting progressive scan and a television receiver adopting interlacing. In a case where a television receiver adopting interlacing is connected to the video signal output device, if "Progressive Output" is selected in the output setting screen, the screen loses its normal display and a confirmation screen is not displayed normally, making it impossible to press a confirmation key. After a lapse of 10 seconds, switching to interlacing is automatically performed.

When a reproducing apparatus incorporating such a conventional video signal output device is used for the first time, it is connected to a television receiver or a monitor and is then turned on, and then interlacing/progressive setting is performed in television screen setting. However, in this case, the user has to perform interlacing/progressive setting not through a dialog but through complicated and time-consuming operations such as operating a remote control to cause a television receiver or a monitor to display a menu screen and then performing interlacing/progressive setting. In addition, the conventional technique disclosed in JP-A-2004-356688 does not give any description about aspect ratio setting, making it impossible to set an aspect ratio in television screen setting.

Another conventional technique disclosed in JP-A-2003-153115 optimizes OSD (on-screen display) screen display data generated and outputted by a video device according to an aspect ratio of a video display device when the setting of the aspect ratio of the video display device or the video display device itself is changed, and does not give any description about aspect ratio setting in television screen setting.

SUMMARY OF THE INVENTION

In view of the conventionally experienced problems described above, an object of the present invention is to provide a video signal output device that can perform interlacing/progressive setting and aspect ratio setting in television screen setting through a dialog with a user.

To achieve the above object, according to the present invention, a video signal output device is provided with: a video signal conversion circuit that converts an inputted video signal into an interlaced video signal or a progressive video signal; a video output circuit that outputs the video signal converted by the video signal conversion circuit to a display device; and a control portion. Here, the video output circuit outputs to the control portion a connection presence/absence indicating signal for judging whether or not a predetermined video input terminal of the display device is connected to a predetermined video output terminal. The control portion includes interlacing/progressive selection screen display means that, when interlacing/progressive setting and aspect ratio setting are performed through a dialog to suit television screen setting of the display device, causes the display device to display an interlacing/progressive selection screen if a television screen setting completion flag indicating completion of the television screen setting is not set, and it is judged that the predetermined video input terminal of the display device is connected to the predetermined video output terminal, aspect ratio setting screen display means that, after interlacing/progressive setting is completed by means of the interlacing/progressive selection screen, or if it is judged that the predetermined video input terminal of the display device is not connected to the predetermined video output terminal, causes the display device to display an aspect ratio setting screen for setting an aspect ratio for the display device, and flag setting means that sets the television screen setting completion flag when the aspect ratio is set by means of the aspect ratio setting screen and thus the television screen setting is completed.

With this configuration, when the television screen setting is not set and thus the television screen setting completion flag is not set, and it is judged that the predetermined video input terminal of the display device is not connected to the predetermined video output terminal, the interlacing/progressive selection screen display means attempts to cause the display device to display the interlacing/progressive selection screen. However, in this case, since the video output circuit outputs a progressive video signal at the beginning of the television screen setting, if the display device adopts interlacing, the interlacing/progressive selection screen is not displayed.

On the other hand, in the progressive display device, the interlacing/progressive selection screen is displayed. Thus, when processing for the interlacing/progressive selection screen is performed and then completed, or when the predetermined video input terminal of the display device is not connected to the predetermined video output terminal, the procedure proceeds to processing performed for the aspect ratio setting screen by the aspect ratio setting screen display means. After the aspect ratio setting is completed, the flag setting means sets a television screen setting completion flag. This eliminates the need to perform the television screen setting again even when a power cord of the video signal output device is disconnected from the wall outlet, whereby the power supply is cut off.

With this configuration, when a reproducing apparatus incorporating a video signal output device is connected to a display device such as a television receiver and is then turned on for the first time, it is possible to perform interlacing/progressive setting and aspect ratio setting in television screen setting through a dialog with a user. This makes television screen setting user-friendly. In addition to this, once settings are made, there is no need to perform setting again. This improves usability.

DETAILED DESCRIPTION OF PREFERRED EMBODIMENTS

Figure 1:
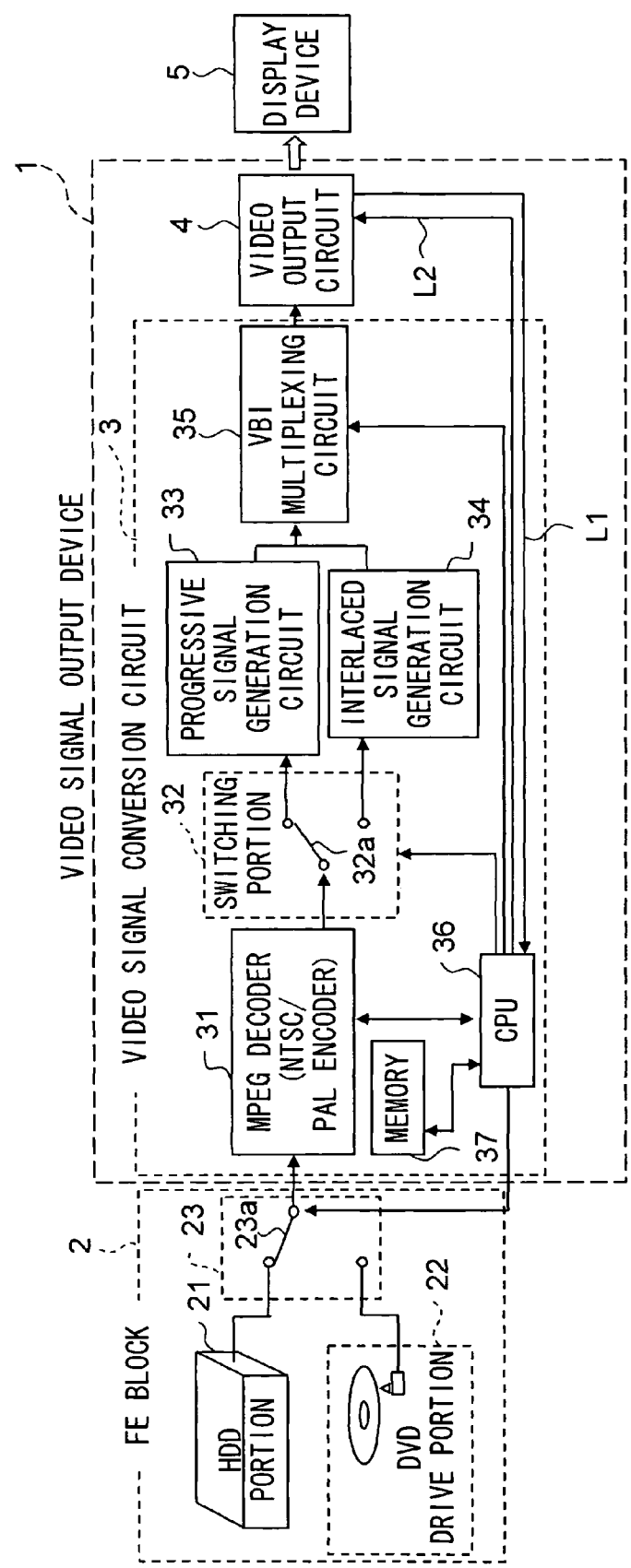
FIG. 1 is a block diagram showing the structure of a reproducing apparatus incorporating a video signal output device according to one embodiment of the present invention.

Hereinafter, an embodiment of the present invention will be described with reference to the accompanying drawings. FIG. 1 is a block diagram showing the structure of a reproducing apparatus incorporating a video signal output device according to the embodiment of the present invention.

The reproducing apparatus includes a front-end block (hereinafter an "FE block") 2 and a video signal output device 1. The video signal output device 1 is built with a video signal conversion circuit 3 included in an AV decoder, and a video output circuit 4. The FE block 2 is provided with an HDD (hard disk drive) portion 21 that reads a video signal recorded on a hard disk in an MPEG format, a DVD drive portion 22 that reads a video signal recorded on a DVD in an MPEG format, and a signal selection/output portion 23 that selects a read signal from the HDD portion 21 or a read signal from the DVD drive portion 22 and then outputs the selected read signal.

The video signal conversion circuit 3 is provided with an MPEG decoder 31 that decodes the read signal from the HDD portion 21 or the DVD drive portion 22, the read signal being selected by the signal selection/output portion 23, into an MPEG format, a switching portion 32 that performs switching of the video signal from the MPEG decoder 31 and then outputs it, a progressive signal generation circuit 33 that converts the video signal inputted from the switching portion 32 after being switched thereby and then generates a progressive video signal, an interlaced signal generation circuit 34 that converts the video signal inputted from the switching portion 32 after being switched thereby and then generates an interlaced video signal, a VBI multiplexing circuit 35 that superimposes an aspect ratio signal or the like on the video signal from the progressive signal generation circuit 33 or the interlaced signal generation circuit 34 during a VBI (vertical blanking interval), a CPU (corresponding to a control portion) 36 that controls the entire reproducing apparatus, and a memory 37 that stores data required for processing of the CPU 36.

The video output circuit 4 feeds, via an unillustrated video output D-terminal and an unillustrated D-connector cable, the video signal outputted from the VBI multiplexing circuit 35 to an unillustrated video input D-terminal of a display device 5. Consequently, the video signal recorded on the hard disk or the DVD is converted into video by the display device 5. Furthermore, the video output circuit 4 outputs, to the CPU 36 via the video output D-terminal, a connection presence/absence indicating signal for judging whether or not the video input D-terminal of the display device 5 is connected to the video output D-terminal. The video output D-terminal transmits the connection presence/absence indicating signal to the CPU 36 via a terminals-connection judgment pin (corresponding to a terminals-connection judgment port), which will be described later.

Here, a basic operation of the CPU 36 of the video signal output device 3 will be described. When a hard disk mode is set by means of an unillustrated remote control, the CPU 36 switches a switch 23a of the signal selection/output portion 23 to the HDD portion 21 side; when a DVD mode is set also by means of the remote control, the CPU 36 switches the switch 23a of the signal selection/output portion 23 to the DVD drive portion 22 side. When interlacing is set in an interlacing/progressive determination screen (hereinafter an "i/p determination screen"), the CPU 36 switches the switch 32a of the switching portion 32 to the interlaced signal generation circuit 34 side; when progressive is set, the CPU 36 switches the switch 32a of the switching portion 32 to the progressive signal generation circuit 33 side. It is to be noted that, when a test video image for i/p determination is displayed on the display device 5 for the first time, the switching portion 32 is so set as to select the progressive signal generation circuit 33, whereby the test video image is displayed on the display device 5 in a progressive manner.

In the NTSC system, for example, the CPU 36 superimposes an aspect ratio signal, which is a bit signal indicating an aspect ratio, on a video signal from the interlaced signal generation circuit 34 or the progressive signal generation circuit 33 in a 20th scan line of 525 scan lines. Moreover, the CPU 36 feeds an aspect ratio identifying signal (a signal of a line L2) to the video output circuit 4. For a widescreen with an aspect ratio of 16:9, the voltage of the aspect ratio identifying signal is 5 V; for a letterboxed screen with an aspect ratio of 4:3, the voltage thereof is 2.2 V; and, for a pan and scan or standard screen with an aspect ratio of 4:3, the voltage thereof is 0 V.

Furthermore, the CPU 36 receives the connection presence/absence indicating signal from the video output circuit 4 through the terminals-connection judgment pin (a pin connected to a line L1) of a video output D-terminal, thereby judging whether or not the video input D-terminal of the display device 5 is connected to the video output D-terminal via the D-connector cable. When no terminal is connected to the video output D-terminal, the terminals-connection judgment pin of the video output D-terminal is pulled up to 5 V, whereby the potential of the terminals-connection judgment pin of the video output D-terminal becomes 5 V (at a high level). When the video input D-terminal of the display device 5 is connected to the video output D-terminal via the D-connector cable, the terminals-connection judgment pin of the video output D-terminal drops to the ground, whereby the potential thereof becomes 0 V (at a low level).

In addition to the terminals-connection judgment pin, the video output D-termninal has a plurality of connection pins for component video signal output, such as a brightness signal output pin, two color-difference signal output pins, an aspect ratio identifying signal output pin, an i/p determination signal output pin, and a ground pin. Such a video output D-terminal is standardized in, for example, EIAJ CP-4120 standard, and a fourteenth pin of the video output D-terminal is used as the terminals-connection judgment pin. The aforementioned judgment as to whether a D-connector is connected or not is adopted only in Japan. In a case where a device is designed for use with a component video output connector other than a D-connector as in North America, it is necessary to display a message by means of an OSD or the like to ask the user whether to use a component video output connector.

As a feature of this embodiment, the CPU 36 also functions as a control portion including interlacing/progressive selection screen display means and interlacing/progressive setting means. When interlacing/progressive setting and aspect ratio setting are performed through a dialog to suit the television screen setting of the display device 5, if a television screen setting completion flag indicating completion of television screen setting is not set, and it is judged that the video input D-terminal of the display device 5 is connected to the video output D-terminal, the interlacing/progressive selection screen display means causes the display device 5 to display an interlacing/progressive selection screen. After the interlacing/progressive selection screen is displayed if progressive setting is selected within a predetermined time, the interlacing/progressive setting means sets a video output of the video output circuit 4 to progressive; if progressive setting is not selected within the predetermined time, the interlacing/progressive setting means sets a video output of the video output circuit 4 to interlacing.

Furthermore, the CPU 36 also functions as a control portion including aspect ratio setting screen display means, test video image display means, aspect ratio setting means, and flag setting means. After interlacing/progressive setting is completed, or if it is judged that the video input D-terminal of the display device 5 is not connected to the video output D-terminal, the aspect ratio setting screen display means causes the display device 5 to display an aspect ratio setting screen for setting an aspect ratio for the display device 5. If the time elapsed after the start of aspect ratio setting is within a predetermined time, the test video image display means causes the display device 5 to display a test video image with an aspect ratio of 16:9. If it is judged that a figure displayed in the center of the test video image is a circle, the aspect ratio setting means sets the screen to a widescreen with an aspect ratio of 16:9; if the time elapsed after the start of aspect ratio setting exceeds the predetermined time, or if it is judged that a figure displayed in the center of the test video image is an ellipse, the aspect ratio setting means sets the screen to a letterboxed screen with an aspect ratio of 4:3. When the television screen setting is completed, the flag setting means sets the television screen setting completion flag.

Figure 2:
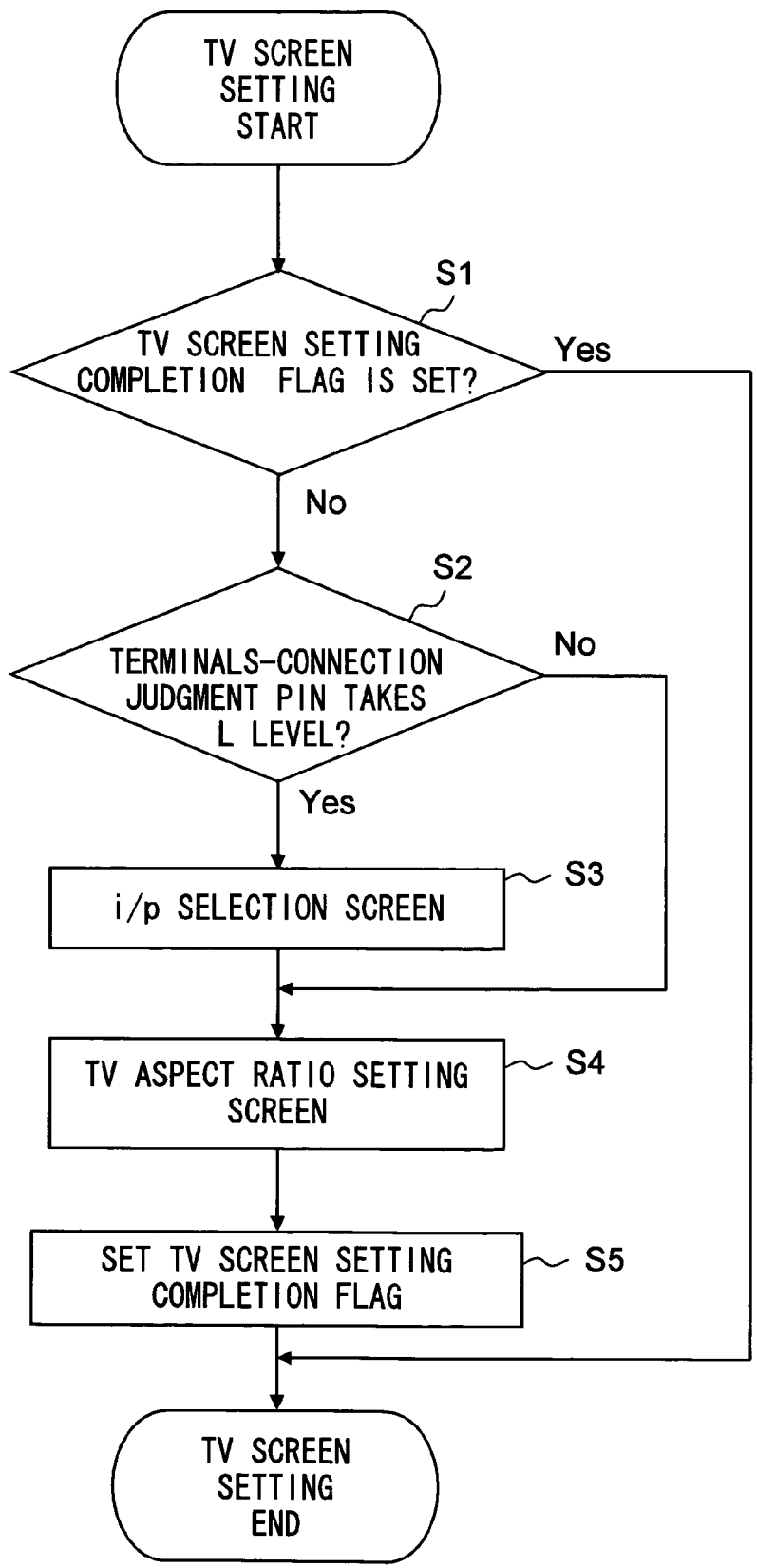
FIG. 2 is a flow chart showing the entire procedure for performing television screen setting through a dialog in the embodiment.
Figure 3:
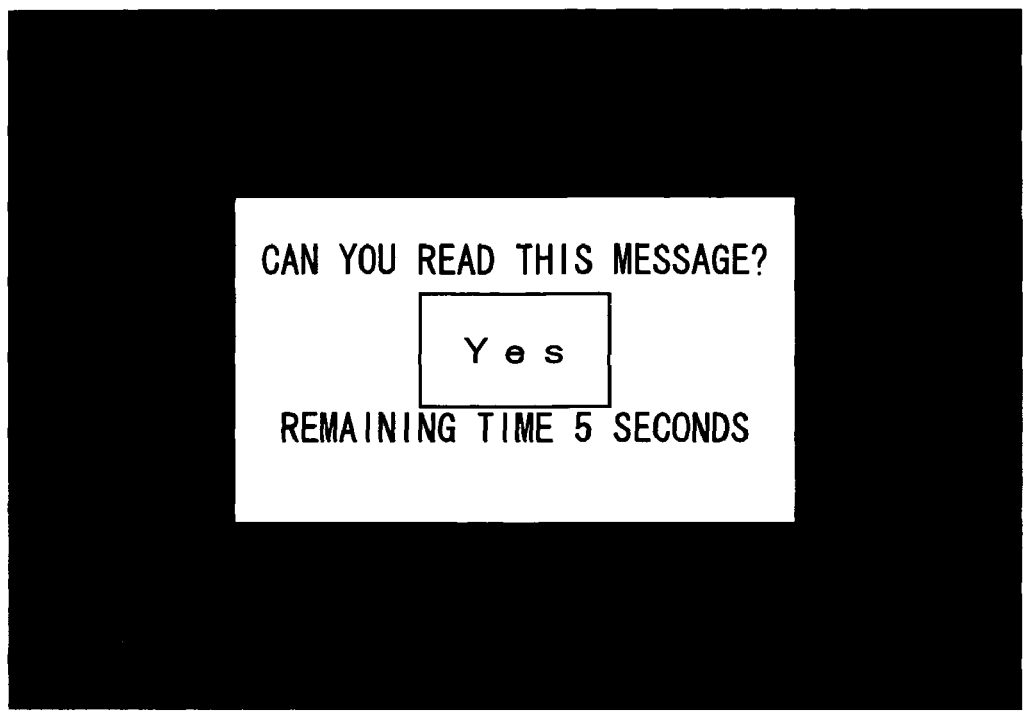
FIG. 3 is an illustration showing an example of an interlacing/progressive determination screen in the embodiment.

FIG. 2 is a flow chart showing the entire procedure for performing television screen setting through a dialog in the embodiment. FIG. 3 is an illustration showing an example of the interlacing/progressive determination screen in the embodiment. With reference to this flow chart and FIGS. 1 and 3, the entire procedure for performing television screen setting through a dialog will be described.

After television screen setting is started, the CPU 36 judges whether a television screen setting completion flag is set or not (step S1). In general, if television screen setting is already set, a set value relating to television screen setting (i/p setting and aspect ratio setting) is set in the memory 37. In addition to this, the television screen setting completion flag indicating whether or not such a set value is already set, that is, whether or not the television screen setting completion flag is set (on/off of the television screen setting completion flag) is stored in the memory 37. The process at step S1 is performed to detect whether the television screen setting is already set or not when the video signal output device 1 and the display device 5 are operated after being turned on. Thus, if the television screen setting completion flag is found to be set, indicating that the television screen setting is already completed ("YES" in step S1), the procedure for the television screen setting is ended.

If the television screen setting has yet to be set and the television screen setting completion flag is found not to be set ("NO" in step S1), then i/p setting is started. Before doing this setting, the CPU 36 judges whether or not the potential of the terminals-connection judgment pin is 0 V and at an L level (low level) (step S2). If the potential of the terminals-connection judgment pin is found to be 0 V and at an L level ("YES" in step S2), this means that the video input D-terminal of the display device 5 is connected to the video output D-terminal via the D-connector cable. Then, the procedure proceeds to step S3, and the interlacing/progressive selection screen display means of the CPU 36 attempts to cause the display device 5 to display an i/p selection screen (for example, the i/p determination screen shown in FIG. 3).

In this case, however, as mentioned earlier, since the video output circuit 4 outputs a progressive video signal at the beginning of the television screen setting, if the display device 5 adopts interlacing, the i/p determination screen shown in FIG. 3 is not displayed.

Figure 4:
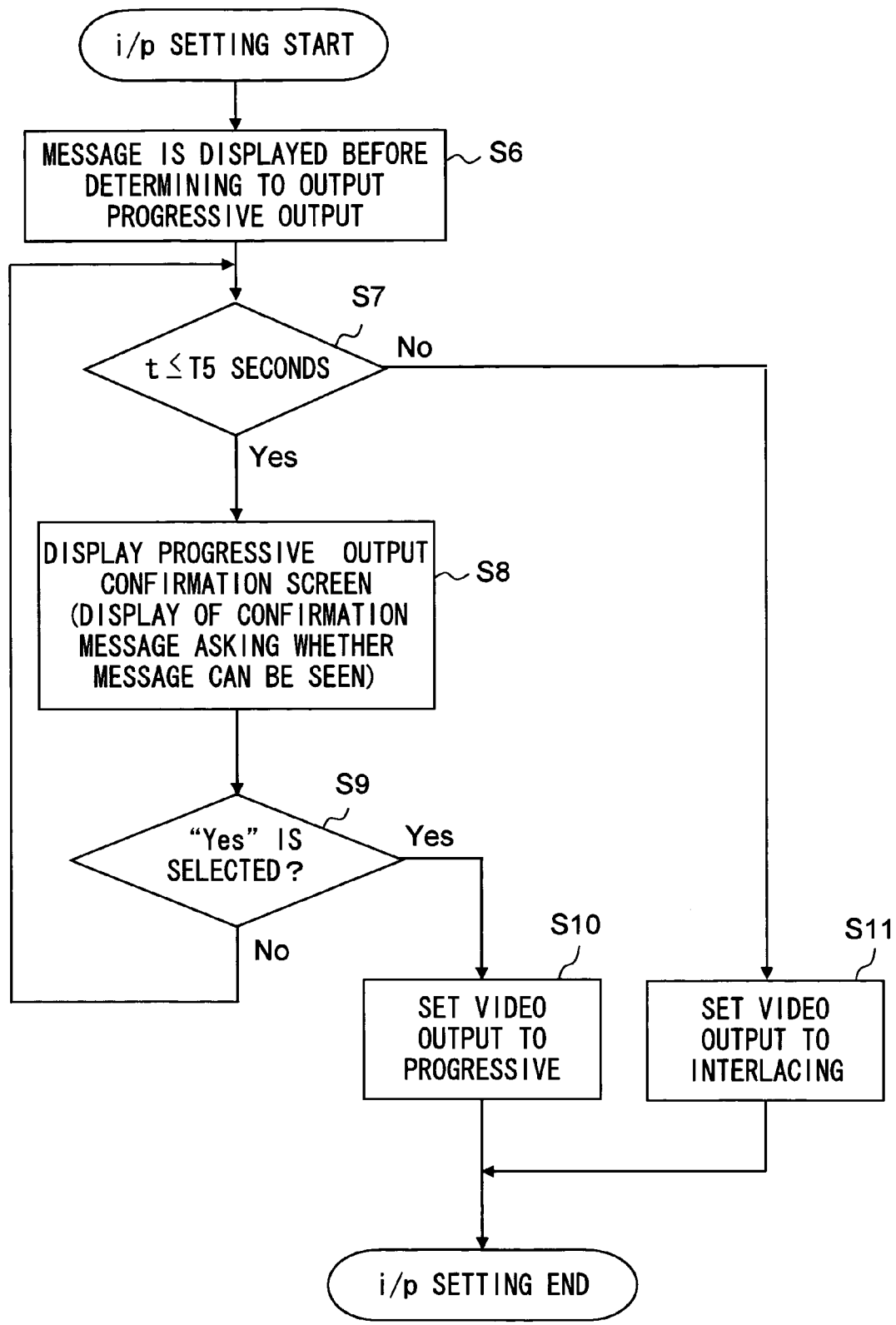
FIG. 4 is a flow chart showing the processing performed for the i/p selection screen shown in FIG. 2.

FIG. 4 is a flow chart showing the processing performed for the i/p selection screen shown in FIG. 2 (the processing performed to set a video output of the video output circuit 4 to interlacing or progressive). With reference to this flow chart, the processing performed for the i/p selection screen will be described.

In the i/p determination screen shown in FIG. 3, the interlacing/progressive selection screen display means displays, before determining to output a progressive output, a message saying "CAN YOU READ THIS MESSAGE?" on the display device 5 (step S6). Then, it is judged whether or not the time "t" elapsed after the message is displayed is within a predetermined time T. In this example, the predetermined time T is 5 seconds, and thus the time allotted after the display of the i/p determination screen is 5 seconds. When the user selects "Yes" by remote control operation within 5 seconds, the interlacing/progressive setting means of the CPU 36 sets a video output of the video output circuit 4 to progressive. That is, if a progressive output confirmation screen display (a display of a confirmation message asking whether the message can be seen) is performed (step S8) when the elapsed time "t" is within the predetermined time T (5 seconds) ("YES" in step S7), and "Yes" is selected by pressing the Enter key of the remote control (step S9), a video output of the video signal output device 1 (an output of the video output circuit 4) is set to progressive (step S10).

On the other hand, if "Yes" is not selected and the predetermined time T (5 seconds) has passed ("NO" in step S7), it is impossible to display the i/p determination screen shown in FIG. 3, or, if the display device 5 adopts interlacing, it is impossible to display the i/p determination screen shown in FIG. 3 since the video output circuit 4 outputs a progressive video signal at the beginning of the television screen setting. In such cases, the interlacing/progressive selection screen display means of the CPU 36 sets a video output of the video output circuit 4 to interlacing (step S11).

This is the end of the processing performed to set a video output of the video output circuit 4 to interlacing or progressive.

Back in FIG. 2, the description of the television screen setting will be continued. When the processing performed for the i/p selection screen is ended (step S3), or when the terminals-connection judgment pin takes an H level, indicating that the video input D-terminal of the display device 5 is not connected to the video output D-terminal (step S2), the procedure proceeds to the processing performed for a TV aspect ratio setting screen (step S4).

Figure 5:
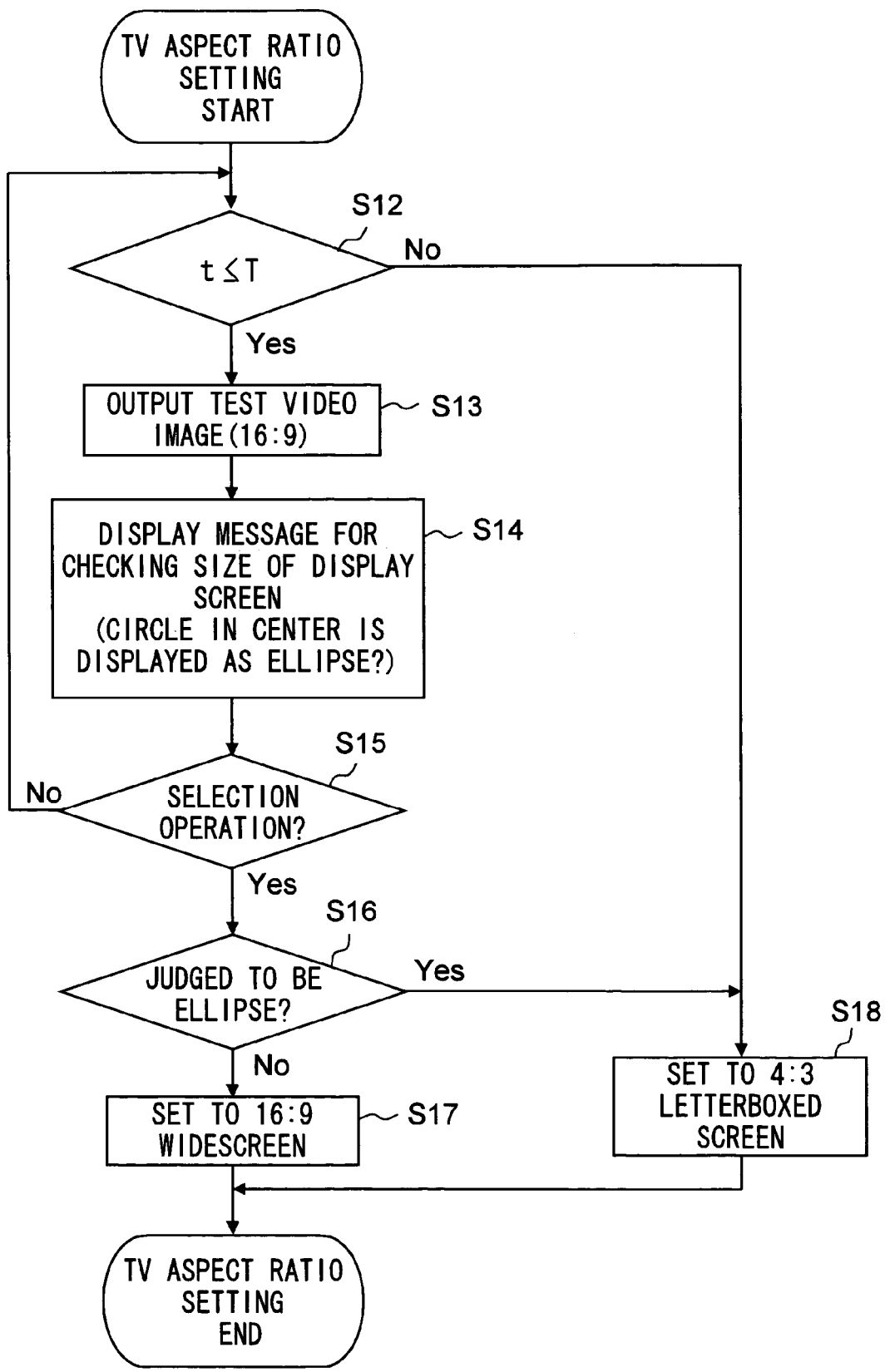
FIG. 5 is a flow chart showing the processing performed for the TV aspect ratio setting screen shown in FIG. 2.
Figure 6A:
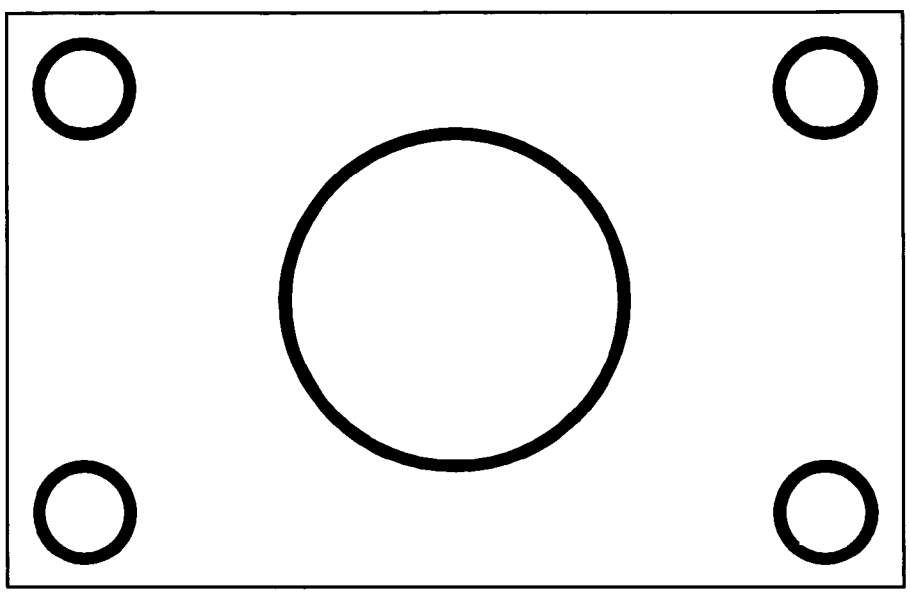
FIG. 6A is an illustration showing an example of a TV aspect ratio check screen before a message of a test video image with an aspect ratio of 16:9 is displayed in the embodiment.
Figure 6B:
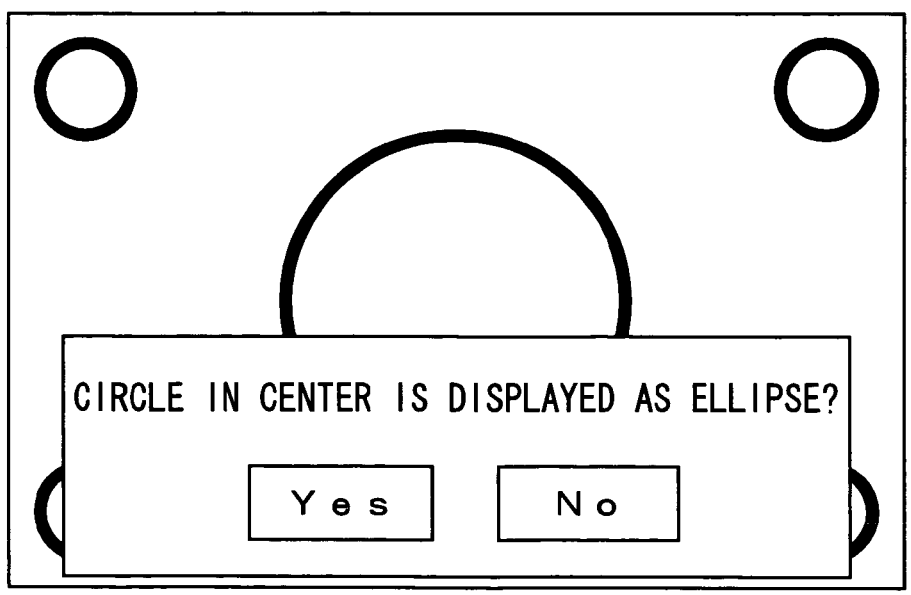
FIG. 6B is an illustration showing an example of a TV aspect ratio check screen in which a message of a test video image with an aspect ratio of 16:9 is displayed in the embodiment.

FIG. 5 is a flow chart showing the processing performed for the TV aspect ratio setting screen shown in FIG. 2. FIG. 6A is an illustration showing an example of a TV aspect ratio check screen before a message of a test video image with an aspect ratio of 16:9 is displayed in the embodiment. FIG. 6B is an illustration showing an example of a TV aspect ratio check screen in which a message of a test video image with an aspect ratio of 16:9 is displayed in the embodiment. With reference to FIGS. 5 to 6B, the processing performed for the TV aspect ratio setting screen will be described.

If the CPU 36 judges that the time "t" elapsed after the start of the TV aspect ratio setting is equal to or less than a predetermined time T ("YES" in step S12), the test video image display means of the CPU 36 outputs a test video image (with an aspect ratio of 16:9) shown in FIG. 6A to the display device 5 (step S13), and displays a message saying, for example, as shown in FIG. 6B, "THE CIRCLE IN THE CENTER IS DISPLAYED AS AN ELLIPSE?" as a message for checking the size of the display screen (step S14).

Figure 7:
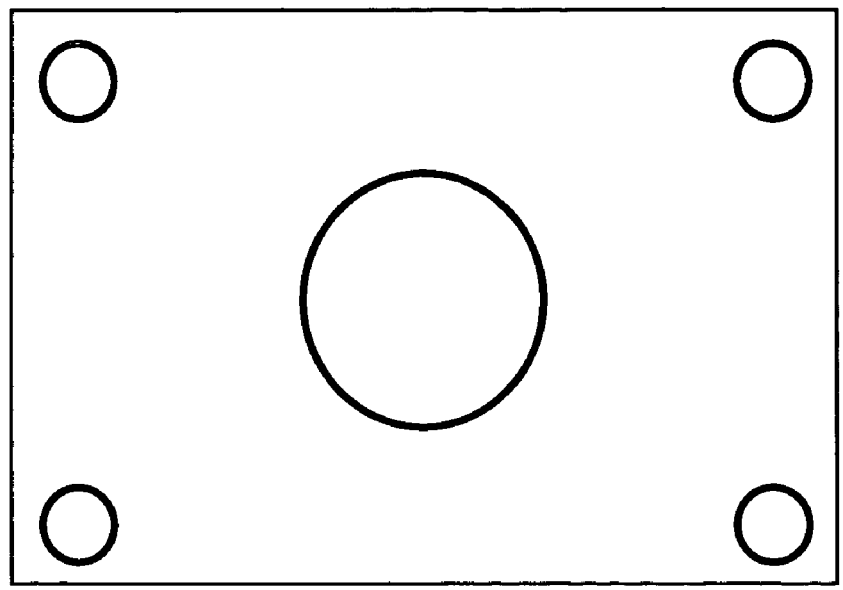
FIG. 7 is an illustration showing an example of a TV aspect ratio check screen wherein a video image with an aspect ratio of 16:9 is displayed in a pan and scan screen with an aspect ratio of 4:3 in the embodiment.
Figure 7:
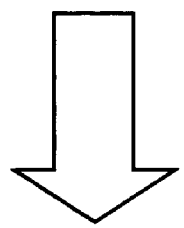
Figure 7:
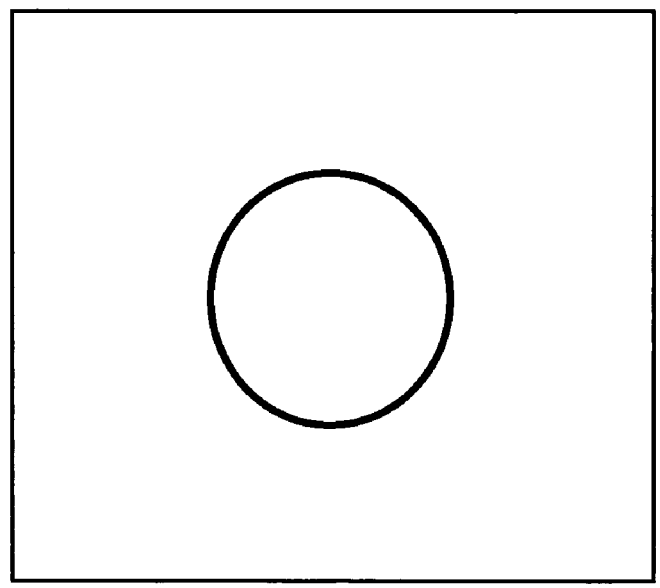
Figure 8:
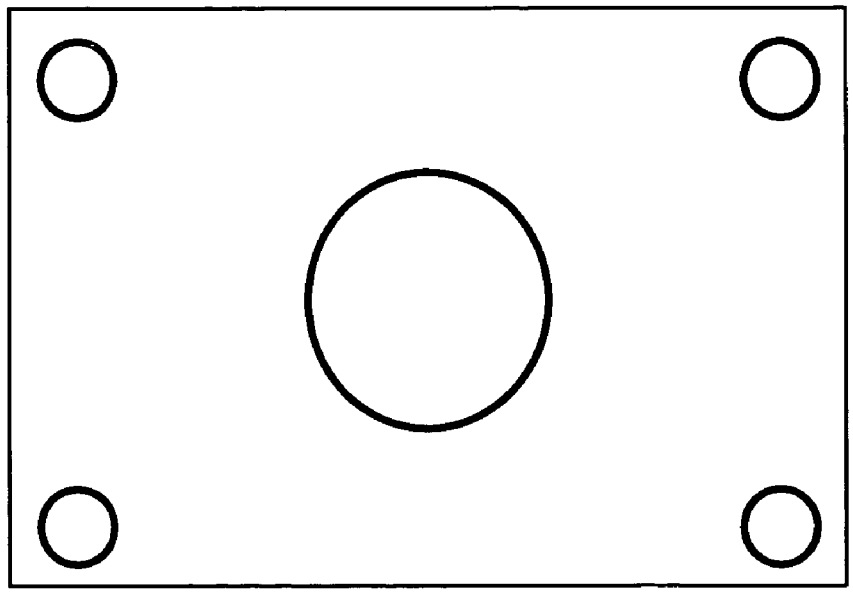
FIG. 8 is an illustration showing an example of a TV aspect ratio check screen wherein a video image with an aspect ratio of 16:9 is displayed in a standard screen with an aspect ratio of 4:3 in the embodiment.
Figure 8:
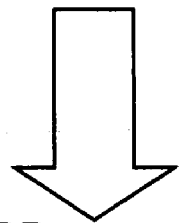
Figure 8:
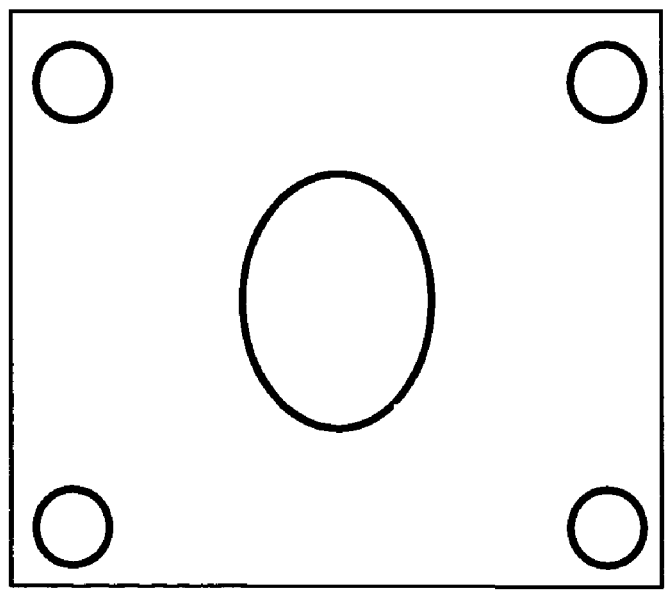

For a pan and scan screen with an aspect ratio of 4:3, since the video image with an aspect ratio of 16:9 is displayed with the sides thereof cropped off without reducing its original size, four small circles in the four corners of the TV aspect ratio check screen as shown in FIGS. 6A and 6B are not displayed. As shown in FIG. 7, only the circle in the center is displayed as it is. For a standard screen with an aspect ratio of 4:3, since the video image with an aspect ratio of 16:9 is displayed with its size reduced, four small circles in the four corners of the TV aspect ratio check screen as shown in FIGS. 6A and 6B are displayed, and, as shown in FIG. 8, the circle in the center is displayed as an ellipse.

Here, the CPU 36 judges whether or not the user performs an operation for selecting "Yes" or "No" by means of the remote control in the TV aspect ratio check screen shown in FIG. 6B (step S15). If the selection operation is found to be performed, it is judged whether or not "Yes" is selected by determining that the circle in the center is an ellipse (step S16). If it is found that "Yes" is selected by determining that the circle in the center is an ellipse ("YES" in step S16), the aspect ratio setting means of the CPU 36 sets the screen of the display device 5 to a letterboxed screen with an aspect ratio of 4:3 (step S18). If it is found that "No" is selected by determining that the circle in the center is not an ellipse ("NO" in step S16), the aspect ratio setting means of the CPU 36 sets the screen of the display device 5 to a widescreen with an aspect ratio of 16:9 (step S17). In the letterboxed screen, to display a video image with an aspect ratio of 16:9 on a screen with an aspect ratio of 4:3, the original video image is reduced in the horizontal and vertical directions at the same rate, and is displayed with black borders above and below it to fill the screen.

This is the end of the TV aspect ratio setting. Back in FIG. 2, the description of the television screen setting will be continued. Then, the flag setting means of the CPU 36 sets the television screen setting completion flag indicating completion of i/p setting and TV aspect ratio setting (step S5), and stores in the memory 37 the on-state of the television screen setting completion flag and television screen setting completion information (i/p and TV aspect ratio that have been set in the television screen setting). This is because it is thereby possible to eliminate the need to perform the television screen setting again as a result of the television screen setting completion flag being set even when a power cord of the video signal output device 1 is disconnected from the wall outlet, whereby the power supply is cut off. Used as the above-described memory 37 is a nonvolatile memory such as a flash ROM that can hold data even when the power supply is cut off.

If a timeout occurs in any of the processing described in this embodiment, the settings are supposed to be reset to the defaults. In a case where a device is designed for use with a component video output connector other than a D-connector as in North America, it is necessary to display a message by OSD processing or the like to ask the user whether to use a component video output connector. The embodiment described above deals with a video signal output device provided with a video output D-terminal. It is to be understood, however, that the present invention is applicable also to a video signal output device provided with a video output terminal (for example, a video output DVI terminal or a video/audio output HDMI terminal) having a terminals-connection judgment pin, other than a video output D-terminal.

As described above, according to this embodiment, when a reproducing apparatus incorporating a video signal output device is connected to a display device such as a television receiver and is then turned on for the first time, it is possible to perform interlacing/progressive setting and aspect ratio setting in television screen setting through a dialog with a user. This makes television screen setting user-friendly. In addition to this, once settings are made, there is no need to perform setting again. This improves usability.

What is claimed is:

1. A video signal output device, comprising:
    a video signal conversion circuit that converts an inputted video signal into an interlaced video signal or a progressive video signal;
    a video output circuit that outputs the video signal converted by the video signal conversion circuit to a display device; and
    a control portion, wherein
    the video output circuit outputs to the control portion a connection presence/absence indicating signal for judging whether or not a predetermined video input terminal of the display device is connected to a predetermined video output terminal, and
    the control portion includes
        interlacing/progressive selection screen display means that, when interlacing/progressive setting and aspect ratio setting are performed through a dialog to suit television screen setting of the display device, causes the display device to display an interlacing/progressive selection screen if a television screen setting completion flag indicating completion of the television screen setting is not set, and it is judged that the predetermined video input terminal of the display device is connected to the predetermined video output terminal,
        aspect ratio setting screen display means that, after interlacing/progressive setting is completed by means of the interlacing/progressive selection screen, or if it is judged that the predetermined video input terminal of the display device is not connected to the predetermined video output terminal, causes the display device to display an aspect ratio setting screen for setting an aspect ratio for the display device, and
        flag setting means that sets the television screen setting completion flag when the aspect ratio is set by means of the aspect ratio setting screen and thus the television screen setting is completed.

2. The video signal output device of claim 1, wherein
    the predetermined video output terminal has a terminals-connection judgment port that takes one level when the predetermined video input terminal of the display device is connected to the predetermined video output terminal, and that takes another level when the predetermined video input terminal is not connected to the predetermined video output terminal, and
    the video output circuit outputs the connection presence/absence indicating signal to the control portion via the terminals-connection judgment port.

3. The video signal output device of claim 2, wherein
    the control portion further includes
        interlacing/progressive setting means that, after the interlacing/progressive selection screen is displayed, if progressive setting is selected within a predetermined time, sets a video output of the video output circuit to progressive, and, if progressive setting is not selected within the predetermined time, sets a video output of the video output circuit to interlacing,
        test video image display means that causes the display device to display a test video image with an aspect ratio of 16:9 if a time elapsed after a start of the aspect ratio setting is within a predetermined time, and
        aspect ratio setting means that, if it is judged that a figure displayed in a center of the test video image is a circle, sets a screen to a widescreen with an aspect ratio of 16:9, and, if the time elapsed after the start of the aspect ratio setting exceeds the predetermined time, or if it is judged that the figure displayed in the center of the test video image is an ellipse, sets the screen to a letterboxed screen with an aspect ratio of 4:3.

4. The video signal output device of claim 1, wherein
    the control portion further includes
        interlacing/progressive setting means that, after the interlacing/progressive selection screen is displayed, if progressive setting is selected within a predetermined time, sets a video output of the video output circuit to progressive, and, if progressive setting is not selected within the predetermined time, sets a video output of the video output circuit to interlacing,
        test video image display means that causes the display device to display a test video image with an aspect ratio of 16:9 if a time elapsed after a start of the aspect ratio setting is within a predetermined time, and
        aspect ratio setting means that, if it is judged that a figure displayed in a center of the test video image is a circle, sets a screen to a widescreen with an aspect ratio of 16:9, and, if the time elapsed after the start of the aspect ratio setting exceeds the predetermined time, or if it is judged that the figure displayed in the center of the test video image is an ellipse, sets the screen to a letterboxed screen with an aspect ratio of 4:3.

* * * * *